United States Patent
Shimizu et al.

(10) Patent No.: US 6,806,648 B2
(45) Date of Patent: Oct. 19, 2004

(54) LIGHT SOURCE DEVICE AND LIQUID CRYSTAL DISPLAY DEVICE

(75) Inventors: Nobuhiro Shimizu, Nara (JP);
Norikazu Yamamoto, Yawata (JP);
Teruaki Shigeta, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/300,986

(22) Filed: Nov. 20, 2002

(65) Prior Publication Data

US 2003/0094900 A1 May 22, 2003

(30) Foreign Application Priority Data

Nov. 22, 2001 (JP) ........................................ 2001-357126

(51) Int. Cl.$^7$ .......................... H01J 61/30; H01J 61/04; G02B 27/18
(52) U.S. Cl. ................. 313/607; 313/594; 313/631; 313/637; 313/643
(58) Field of Search ................. 313/568, 572, 313/574, 576, 594, 607, 234, 631, 637, 643

(56) References Cited

U.S. PATENT DOCUMENTS

| | | | |
|---|---|---|---|
| 3,927,342 A | | 12/1975 | Bode et al. |
| 4,013,912 A | * | 3/1977 | Hinson ........................ 313/642 |
| 4,038,577 A | | 7/1977 | Bode et al. |
| 4,387,322 A | * | 6/1983 | Nixon ......................... 313/497 |
| 4,645,979 A | | 2/1987 | Chow |
| 4,899,090 A | * | 2/1990 | Yoshiike et al. ............. 313/607 |
| 5,013,959 A | * | 5/1991 | Kogelschatz ................ 313/607 |
| 5,117,160 A | * | 5/1992 | Konda et al. ................ 313/607 |
| 5,343,114 A | | 8/1994 | Beneking et al. |
| 5,514,934 A | | 5/1996 | Matsumoto et al. |
| 5,604,410 A | | 2/1997 | Vollkommer et al. ....... 315/246 |
| 5,828,180 A | | 10/1998 | Shinada et al. |
| 6,034,476 A | * | 3/2000 | Tamura ....................... 313/607 |
| 6,255,782 B1 | | 7/2001 | Kuroda et al. |
| 6,331,064 B1 | * | 12/2001 | Nishiyama et al. ......... 313/607 |
| 6,590,319 B2 | | 7/2003 | Moom |

FOREIGN PATENT DOCUMENTS

| | | |
|---|---|---|
| EP | 1 146 544 | 10/2001 |
| EP | 1 152 454 | 11/2001 |
| JP | 1-143135 | 6/1989 |
| JP | 4-280059 | 10/1992 |
| JP | 5-029085 | 2/1993 |
| JP | 6-181050 | 6/1994 |
| JP | 9-161726 | 6/1997 |
| JP | 10-112290 | 4/1998 |
| JP | 10-284008 | 10/1998 |
| JP | 11-86797 | 3/1999 |
| JP | 2000-259088 | 9/2000 |
| JP | 2000-353494 | 12/2000 |
| JP | 2001-143662 | 5/2001 |
| JP | 2001-237586 | 8/2001 |
| JP | 2001-243921 | 9/2001 |
| JP | 2001-243922 | 9/2001 |
| JP | 2001-325919 | 11/2001 |
| JP | 2002-42737 | 2/2002 |

* cited by examiner

Primary Examiner—Nimeshkumar D. Patel
Assistant Examiner—Sharlene Leurig
(74) Attorney, Agent, or Firm—Merchant & Gould P.C.

(57) ABSTRACT

A light source device includes at least one discharge tube, a discharge medium sealed inside the discharge tube, and first and second electrodes for exciting the discharge medium. The first electrode is arranged inside or outside the discharge tube, and the second electrode has a plurality of contact portions at which the second electrode is in contact with an outer surface of the discharge tube. The contact portions are located at different distances from the first electrode and are provided discontinuously. Xenon gas and at least one selected from argon gas and krypton gas are sealed in the discharge tube, in which the xenon gas accounts for 60 vol % to 80 vol %. Thus, it is possible to provide a light source device and a liquid crystal display device that provide light emission with high brightness and excellent brightness distribution and that can be manufactured readily.

17 Claims, 15 Drawing Sheets

LIGHT SOURCE DEVICE AND LIQUID CRYSTAL DISPLAY DEVICE

BACKGROUND OF THE INVENTION

1. Field of the Invention

The present invention relates to a light source device and a liquid crystal display device employing the same.

2. Related Background Art

Recently, with respect to backlights (light source devices) for use in liquid crystal displays, etc., studies have been directed to backlights in which mercury is not used (a backlight of this type hereinafter sometimes is referred to as mercuryless backlight), in addition to the studies on backlights in which mercury is used. The mercuryless backlight, which does not employ mercury, does not suffer from a decrease in a light emission efficiency caused by a rise of mercury temperature, thereby having an advantage of a quicker start for the emission of luminous fluxes. Further, the mercuryless backlight is environmentally preferable.

As a light source device in which mercury is not used, a discharge lamp device is disclosed that includes a bulb in which a rare gas is sealed, an inner electrode provided inside the bulb, and an outer electrode provided outside the bulb (JP 5(1993)-29085 A). The outer electrode is a linear electrode, and is formed on an outer surface of the bulb so as to be parallel with a central axis of the bulb. By applying a voltage across the inner and outer electrodes, this rare gas discharge lamp device emits light.

Further, a rare gas discharge lamp is disclosed that includes a discharge tube in which a rare gas is sealed, an inner electrode formed inside the discharge tube, and an outer electrode formed spirally on an outer surface of the discharge tube (JP 10(1998)-112290 A).

Furthermore, as a discharge lamp with a rare gas as a principal discharge medium, a discharge lamp is disclosed that includes an air-tight vessel, an inner electrode provided inside the air-tight vessel, and an outer electrode in such a form as a coil form, a mesh form, etc. (JP 2001-325919 A). This publication discloses a method of fixing the outer electrode using a shrinkable tube.

Furthermore, a discharge lamp disclosed in U.S. Pat. No. 5,604,410 includes a discharge tube in which a rare gas is sealed, an inner electrode, and an outer electrode. The inner electrode is formed along a central axis of the discharge tube throughout a substantial entirety of the discharge tube. The outer electrode is a linear electrode, and is formed on an outer surface of the discharge tube so as to be parallel with a central axis of the discharge tube.

However, in the case where a linear outer electrode is formed throughout a substantial entirety of the discharge tube, the discharge is concentrated in the vicinity of the outer electrode, thereby becoming constricted. This sometimes makes it impossible to excite the discharge medium efficiently, sometimes resulting in a decrease in the light emission efficiency. In the case where an outer electrode in a spiral form is provided on an outer surface of a discharge tube, the discharge also tends to be constricted, since the outer electrode is brought into contact linearly with the outer surface of the discharge tube.

SUMMARY OF THE INVENTION

Therefore, with the foregoing in mind, it is an object of the present invention to provide a novel light source device, and a liquid crystal display device employing the same.

To achieve the foregoing object, a light source device of the present invention includes: at least one discharge tube; a discharge medium sealed inside the discharge tube; and first and second electrodes for exciting the discharge medium. The first electrode is arranged inside or outside the discharge tube. The second electrode is in contact with an outer surface of the discharge tube at a plurality of contact portions that are located at different distances from the first electrode and are provided discontinuously. A mixture gas containing xenon gas and at least one selected from argon gas and krypton gas is sealed in the discharge tube, the xenon gas accounting for 60 percent by volume (vol %) to 80 vol %. With this light source device, light emission with uniform brightness distribution and high brightness is provided.

In the foregoing light source device, the mixture gas may be a mixture gas of argon gas and xenon gas.

In the foregoing light source device, the discharge medium preferably does not contain mercury.

In the foregoing light source device, the mixture gas may be sealed at a pressure in a range of 13 kPa to 36 kPa.

In the foregoing light source device, the plurality of the contact portions may be arranged in a tube axial direction of the discharge tube.

The foregoing light source device further may include a phosphor layer formed on an inner surface of the discharge tube.

In the foregoing light source device, the discharge tube may include a glass tube, and a dielectric layer formed on an outer surface of the glass tube.

In the foregoing light source device, the second electrode may be in contact with the discharge tube via a dielectric.

The foregoing light source device further may include a supporting plate, wherein the discharge tube is arranged on a side of the supporting plate. In this case, the supporting plate may receive light emitted from the discharge tube, and radiate the same from one principal surface of the supporting plate.

The foregoing light source device further may include a supporting plate, with a plurality of the discharge tubes being held on the supporting plate, the second electrode including a plurality of linear electrodes arranged in parallel on the supporting plate, and the discharge tubes being arranged so as to be perpendicular to the linear electrodes.

Furthermore, a liquid crystal display device of the present invention includes a light source device, and a liquid crystal panel that transmits light emitted from the light source device, wherein the light source device is the above-described light source device of the present invention.

DETAILED DESCRIPTION OF THE INVENTION

Figure 1A:
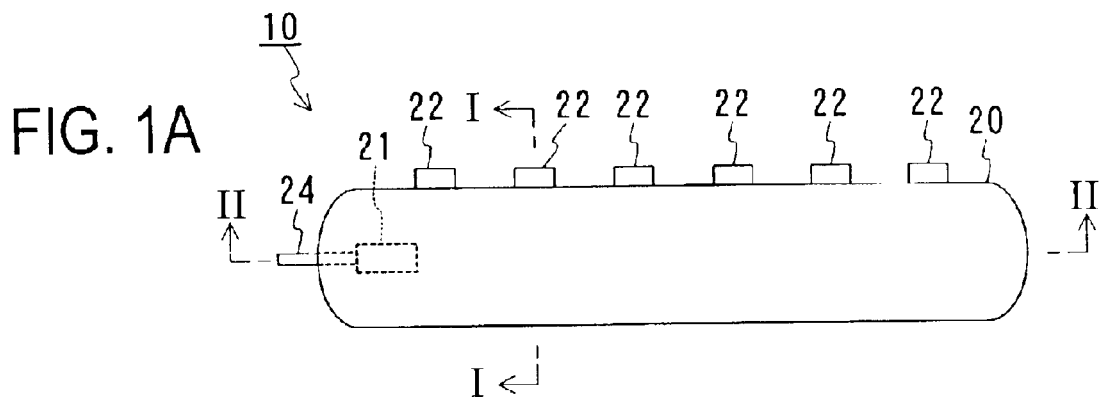
FIGS. 1A and 1B are a side view and a cross-sectional view, respectively, illustrating an example of a light source device of the present invention.

The following will describe embodiments of the present invention while referring to the drawings. It should be noted that in the following description, the same members are designated by the same reference numerals and duplicate descriptions of the same are omitted in some cases.

Embodiment 1

Figure 1B:

In Embodiment 1, an example of a light source device (discharge lamp device) of the present invention is described. FIG. 1A illustrates a configuration of a light source device 10 of Embodiment 1. FIG. 1B is a cross-sectional view of the light source device 10 taken along a line I—I in FIG. 1A. The light source device 10 includes a discharge tube 20, a first electrode 21 provided inside the discharge tube 20, and a second electrode 22 provided outside the discharge tube 20. The first electrode 21 is connected to a lead 24.

Figure 1C:
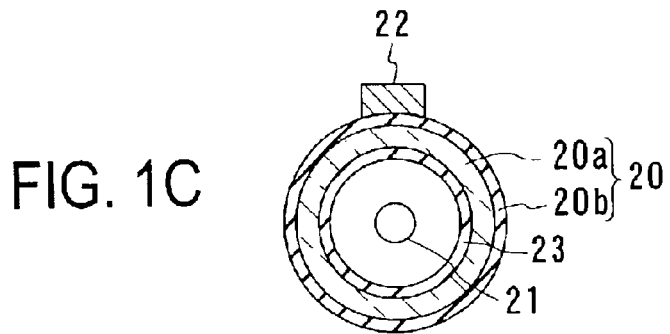
FIG. 1C is a cross-sectional view illustrating another example of a light source device.

The discharge tube 20 is made of a transparent material, for instance, borosilicate glass. Alternatively, the discharge tube 20 may be made of quartz glass, soda-lime glass, or lead glass. The discharge tube 20 may include a dielectric layer (for instance, a resin layer) arranged on an outer surface thereof. An example of such a discharge tube 20 is shown in FIG. 1C. The discharge tube 20 includes a tube 20a, and a dielectric layer 20b formed on an outer surface of the tube 20a. The tube 20a is made of, for example, borosilicate glass. To form the dielectric layer 20b, it is possible to use, for instance, a multilayer film made of a polyester-based resin, or a thin film made of titanium oxide or silicon oxide. The glass tube used for forming the discharge tube 20 normally has an outside diameter of approximately 1.2 mm to 15 mm. Normally, the distance between the outer surface and an inner surface of the glass tube, that is, a wall thickness of the glass tube, is approximately 0.2 mm to 1.0 mm. In the case where a dielectric layer is formed on a surface of the glass tube, the dielectric layer normally has a thickness of approximately 0.5 µm to 100 µm. It should be noted that the discharge tube 20 does not necessarily have a straight shape, but may have another shape. For instance, it may be formed in a shape of the letter L or the letter U, or in a rectangular shape.

The discharge tube 20 is sealed, and a discharge medium (not shown) is encapsulated in the discharge tube (this also applies to Embodiments described later). The discharge medium contains at least xenon. Xenon gas is sealed in the discharge tube 20, along with at least one selected from argon gas and krypton gas. A content of xenon gas in the gas sealed in the discharge tube 20 is within a range of 60 vol % to 80 vol %. The gas other than xenon gas account for 40 vol % to 20 vol %, and usable as such a gas is argon gas, krypton gas, or a mixture gas of argon gas and krypton gas. For instance, examples of the gas sealed in the discharge tube 20 include: a mixture gas of xenon gas (60 vol % to 80 vol %) and argon gas (40 vol % to 20 vol %); a mixture gas of xenon gas (60 vol % to 80 vol %) and krypton gas (40 vol % to 20 vol %); and a mixture gas of xenon gas (60 vol % to 80 vol %), argon gas, and krypton gas. It should be noted that the gas sealed in the discharge tube 20 may contain a trace quantity of a gas (for instance, a rare gas) other than the foregoing rare gases. However, from the environmental viewpoint, the discharge medium preferably does not contain mercury.

The pressure of the gas sealed in the discharge tube 20, that is, the pressure inside the discharge tube 20, preferably falls in a range of 13 kPa to 36 kPa, more preferably in a range of 17 kPa to 28 kPa. It should be noted that the type and the pressure of a gas sealed in the discharge tube 20 as described above apply to light source devices according to the embodiments described below.

As shown in FIG. 1B, a phosphor layer 23 is formed on an inner surface of the discharge tube 20. The phosphor layer 23 is formed so as to convert a wavelength of light emitted by the discharge medium. By altering the materials of the phosphor layer 23, lights with various wavelengths can be obtained. For example, white light, red, green, and blue (RGB) lights, etc. can be obtained. The phosphor layer 23 can be made of a material generally used in a discharge lamp.

Figure 1D:
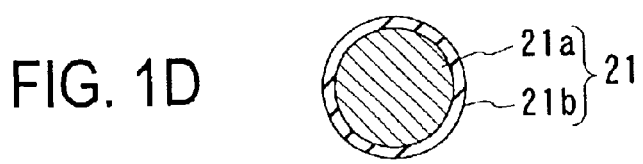
FIG. 1D is a cross-sectional view illustrating an example of a first electrode.

The first electrode 21 is formed inside an end of the discharge tube 20. The first electrode 21 can be made of a metal, for instance, tungsten or nickel. A surface of the first electrode 21 may be covered with a metal oxide layer made of, for instance, cesium oxide, magnesium oxide, barium oxide, etc. The use of such a metal oxide layer allows an illumination start voltage to decrease, thereby preventing the electrode from being degraded by ion impact. Alternatively, the surface of the first electrode 21 may be covered with a dielectric layer (for instance, a glass layer). FIG. 1D is a cross-sectional view of the first electrode 21 that includes a metal electrode 21a, and a dielectric layer 21b formed so as to cover the metal electrode 21a. The use of such a dielectric layer makes it possible to suppress current upon discharge. This suppresses the continuous flow of current upon discharge, thereby stabilizing the discharge. Furthermore, the first electrode 21 may be formed outside the discharge tube 20, as described in Embodiment 2.

The second electrode 22 includes a plurality of electrodes 22a formed in contact with the outside of the discharge tube 20. The electrodes 22a are connected with one another via electric lines. The electrodes 22a may be made of a conductive material. For instance, the electrodes 22a may be made of a metal such as copper, aluminum, phosphor bronze, etc. Alternatively, they may be made of a metal paste containing a metal powder (for example, silver powder) and a resin. The second electrode described below can be made of the same materials. The second electrode 22 is in contact with an outer surface of the discharge tube 20 at a plurality of portions (contact portions) thereof that are provided discontinuously and are located at different distances from the first electrode 21.

Figure 2A:
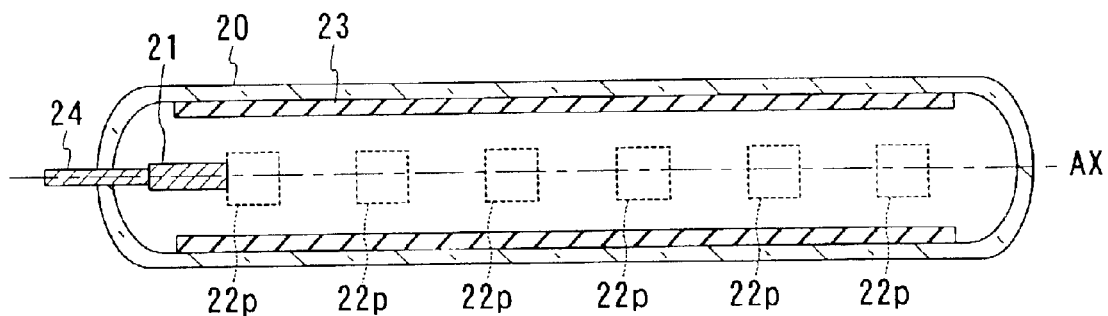
FIG. 2A is a cross-sectional view of the light source device shown in FIG. 1A.
Figure 2B:
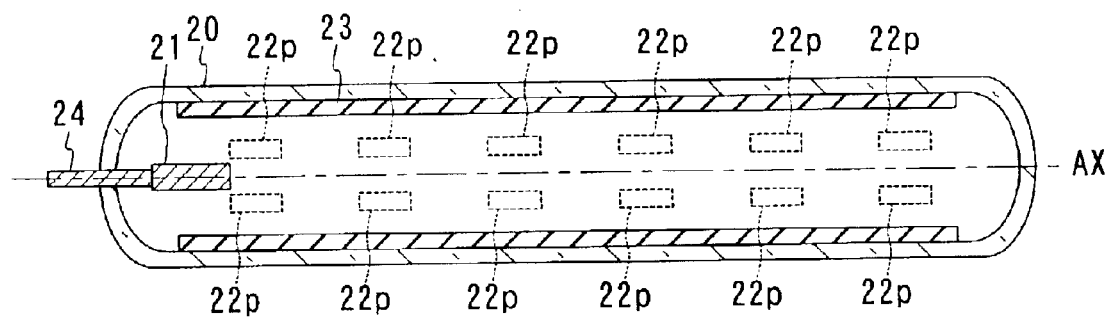
FIG. 2B is a cross-sectional view of another example.

FIG. 2A is a cross-sectional view of the light source device 10 taken along a line II—II in FIG. 1A. The second electrode 22 is in contact with the discharge tube 20 at a plurality of contact portions 22P. The plurality of contact portions 22P are located at different distances from the first electrode 21, and are separated from one another. The plurality of contact portions 22P may be arranged along a tube axial direction AX of the discharge tube 20. It should be noted that as shown in FIG. 2B, the plurality of contact portions 22P may be grouped in a plurality of groups arranged along the tube axial direction AX of the discharge tube 20. The contact portions 22P included in each group are arranged along the tube axial direction AX of the discharge tube 20. However, the arrangement of the contact portions 22P is not limited to the arrangement along the tube axial direction AX. The shape of the contact portion 22P is not limited to square. For instance, the shape of the contact portion 22P may be rectangular or linear. Furthermore, as long as some contact portions that are located at different distances from the first electrode 21 are included, contact portions located at equal distances from the first electrode 21 also may be included, as shown in FIG. 2B. A length of one contact portion 22P in the tube axial direction is in a range of, for instance, 0.1% to 5%, or for instance, 0.5% to 3%, of a length of the discharge tube 20 in the tube axial direction. A distance between two adjacent contact portions 22P in the tube axial direction preferably is greater than the wall thickness of the discharge tube 20, and not greater than ten times a maximum inside diameter of the discharge tube 20. By setting the foregoing distance greater than the wall thickness of the discharge tube 20, it is possible to prevent the discharge from being constricted linearly along the second electrode 22. Besides, by setting the foregoing distance not greater than ten times the maximum inside diameter of the discharge tube 20, it is possible to prevent the discharge from becoming non-uniform. To reduce the blockage of light by the second electrode 22, a length of the contact portion 22P in the circumferential direction of the discharge tube 20 preferably is not more than half of a circumference of the discharge tube 20.

In the light source device 10, the application of a voltage across the first electrode 21 and the second electrode 22 causes discharge, thereby exciting the discharge medium. The discharge medium thus excited emits ultraviolet light when making a transition to a ground state. The ultraviolet light is converted into visible light by the phosphor layer 23, and the visible light is radiated from the discharge tube 20.

Figure 3A:
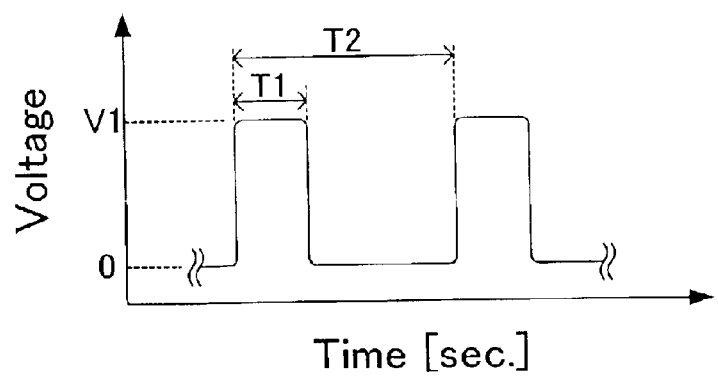
FIG. 3A is a view illustrating an example of a voltage applied to a light source device of the present invention.
Figure 3B:
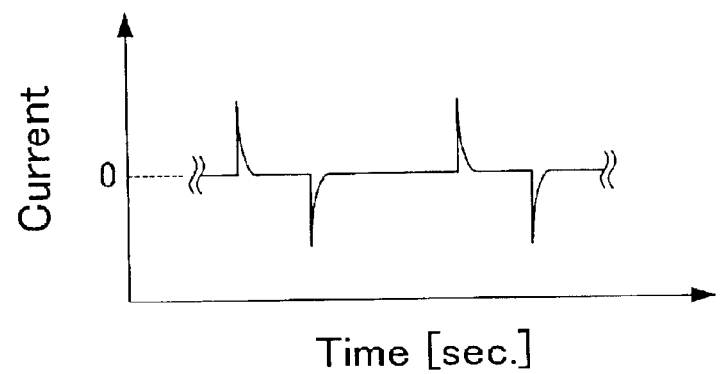
FIG. 3B is a view illustrating an example of a current flowing through electrodes.

The following will describe an example of a voltage applied across the first and second electrodes 21 and 22. The voltage applied across the first and second electrodes 21 and 22 has, for instance, a rectangular waveform, and may have a polarity inversion, which however is not a requirement. An example of such an applied voltage is shown in FIG. 3A. In the example shown in FIG. 3A, the voltage applied to the first electrode 21 is modulated between 0 V and a positive voltage V1. A ratio of a time T1 for the application of the voltage V1 to a cycle T2 of the rectangular wave (T1/T2) preferably is approximately 0.15 to 0.5. The rectangular wave has a frequency in a range of, for example, 10 kHz to 60 kHz. FIG. 3B illustrates the current that flows through the foregoing two electrodes when the voltage shown in FIG. 3A is applied across the same. Current corresponding to a differentiated waveform of the applied voltage flows through the first and second electrodes 21 and 22.

Figure 4:
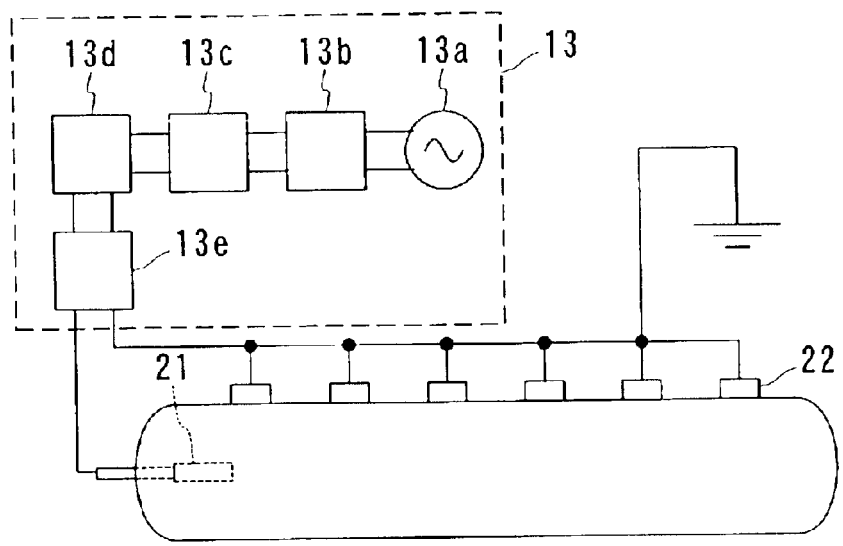
FIG. 4 is a view schematically illustrating an example of a driving circuit for actuating a light source device of the present invention.

FIG. 4 illustrates a configuration of an example of a driving circuit 13 for applying the voltage as shown in FIG. 3A. The driving circuit 13 is connected between the first and second electrodes 21 and 22. The second electrode 22 normally is grounded. The driving circuit 13 may include an AC power supply 13a, a rectifier circuit 13b, a smoothing circuit 13c, a boosting circuit 13d, and a switching circuit 13e. Generally-used circuits can be used as these circuits. An AC voltage generated by the AC power supply 13a is converted into a positive DC voltage by the rectifier circuit 13b. The rectified voltage is smoothed by the smoothing circuit 13c, and is boosted by the boosting circuit 13d. The boosted voltage is applied for a predetermined time T1 by the switching circuit 13e. Thus, a rectangular-waveform voltage is applied. It should be noted that in the case where a rectangular waveform having polarity inversion is applied, the driving circuit can be simplified.

In the light source device 10, since the second electrode 22 is in contact with the discharge tube 20 discontinuously, it is possible to prevent discharge constriction toward the second electrode 22 side. Therefore, with the light source device 10, it is likely to obtain uniform discharge, even if the pressure of the sealed gas is increased, or even if the supplied power is increased. Consequently, in the light source device 10, it is possible to improve the discharge efficiency, and a luminescence thereof can be increased as compared with a conventional light source device to which an equal power is supplied. Furthermore, in the light source device 10, the second electrode 22 can be fixed easily so as to be in contact with the discharge tube 20. Therefore, the light source device 10 can be manufactured readily at a low cost.

Embodiment 2

Figure 5:
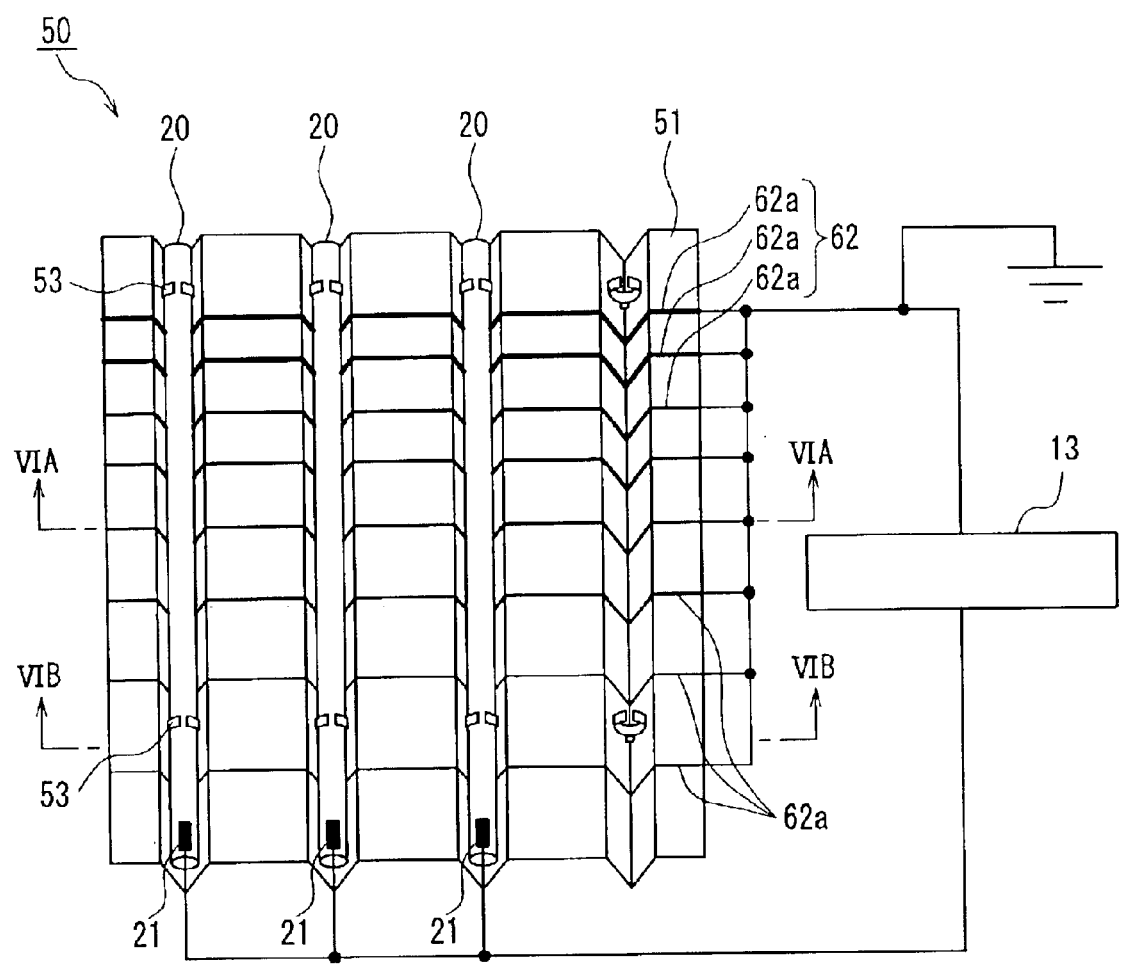
FIG. 5 is a plan view schematically illustrating still another example of a light source device of the present invention.
Figure 6A:
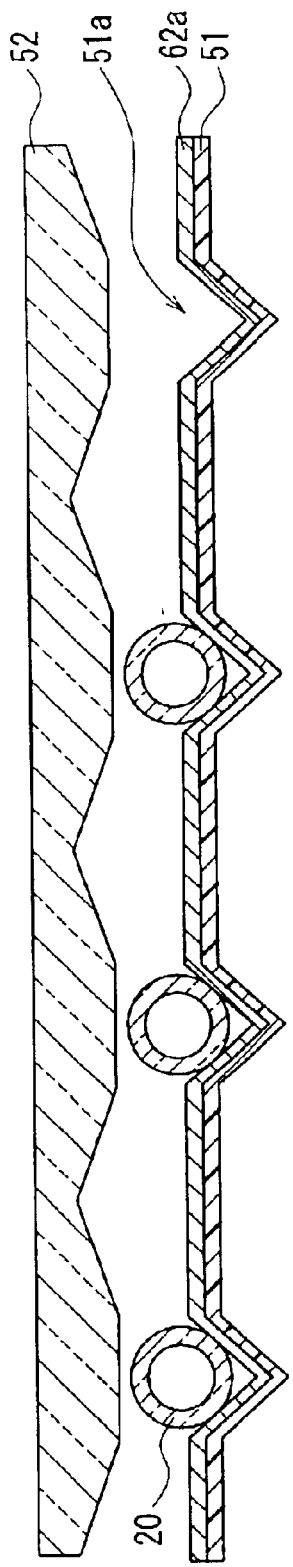
FIGS. 6A and 6B are cross-sectional views of a light source device shown in FIG. 5.
Figure 6B:
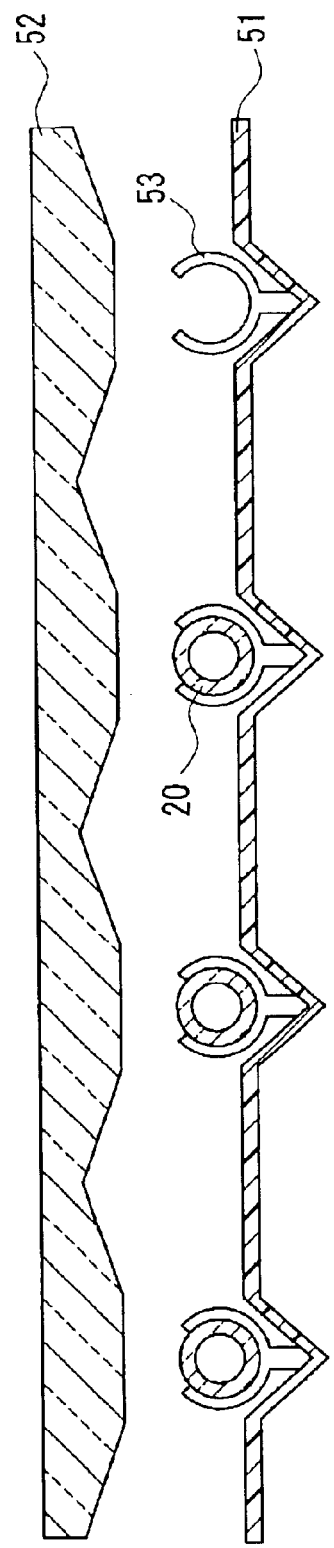

In Embodiment 2, another example of a light source device of the present invention is described. FIG. 5 schematically illustrates a configuration of a light source device 50 of Embodiment 2. FIG. 6A is a cross-sectional view of the light source device 50 taken along a line VIA—VIA in FIG. 5, and FIG. 6B is a cross-sectional view of the same taken along a line VIB—VIB in FIG. 5. It should be noted that the illustration of a diffusing plate is omitted in FIG. 5. In FIGS. 6A and 6B, the illustration of a phosphor layer is omitted. Further, in FIGS. 5, 6A, and 6B, the illustration of a rightmost discharge tube is omitted.

The light source device 50 includes a supporting plate 51, a diffusing plate 52, discharge tubes 20, first electrodes 21 provided inside the discharge tubes 20, and a second electrode 62 provided outside the discharge tubes 20. The second electrode 62 is connected with a ground potential (grounded). A voltage is applied across each first electrode 21 and the second electrode 62 by a driving circuit 13. As the driving circuit 13, any one of generally used circuits such as an inverter circuit can be used.

Grooves 51a having a V-shaped cross section each are formed in the supporting plate 51 so that the discharge tubes 20 are arranged in the grooves 51a. The discharge tubes 20 are fixed to the supporting plate 51 by supporting members 53. The supporting plate 51 can be made of a resin or a metal (for instance, aluminum). A surface of the supporting plate 51 preferably is treated so as to have an increased light reflection efficiency or an increased light diffusion efficiency. For instance, titanium oxide powder may be applied to the surface, or a reflection sheet may be laminated over the surface. Furthermore, a metal film may be formed on the surface of the supporting plate 51 as long as insulation from the second electrode 62 is ensured. Alternatively, the surface may be treated by sand blasting. It should be noted that in the case where light is allowed to leave from a reverse side of the supporting plate 51, the supporting plate 51 is made of a transparent resin or glass. The shape of the supporting plate 51 is not limited, and is determined according to the purpose of use.

The diffusing plate 52 is arranged so as to face the supporting plate 51 with the discharge tubes 20 interposed therebetween. The diffusing plate 52 is arranged so as to uniformly diffuse light emitted from the discharge tubes 20. The diffusing plate 52 is made of glass or a transparent resin.

A plurality of discharge tubes 20 are arranged in parallel with each other on the supporting plate 51. The number of the discharge tubes 20 is not limited. The first electrode 21 is arranged inside an end of each discharge tube 20. The discharge tubes 20 can be detached easily from the supporting members 53.

The second electrode 62 includes a plurality of linear electrodes 62*a* formed on the supporting plate 51. The plurality of linear electrodes 62*a* are connected with each other via wires and are connected to a driving circuit 13. As shown in FIG. 5, the second electrode 62 preferably is grounded. The grounding of the second electrode 62 makes it possible to replace the discharge tubes 20 safely. The plurality of linear electrodes 62*a* may be arranged in stripes so as to be parallel with each other. The linear electrodes 62*a* may be formed so as to cross central axes of the discharge tubes 20 at right angles. The linear electrodes 62*a* may be formed using, for instance, a metal paste (for example, silver paste) or metal films. Alternatively, the linear electrodes 62*a* may be formed using a conductive resin. In this case, the supporting plate 51 made of a resin and the linear electrodes 62*a* made of a resin can be formed integrally.

With distances between adjacent ones of the linear electrodes 62*a* being set to be uniform, sometimes a brightness decreases with decreasing proximity to the first electrodes 21. Therefore, as shown in FIG. 5, the distance between adjacent linear electrodes 62*a* may be decreased with decreasing proximity to the first electrodes 21. In this case, the linear-electrode 62*a* may have an increased width with decreasing proximity to the first electrodes 21. This configuration facilitates obtaining uniform light emission. On the other hand, in the case where the thicknesses of the linear electrodes 62*a* and distances therebetween are set to be uniform, respectively, the manufacture is facilitated. In the light source device of the present invention in particular, since the composition and pressure of a gas sealed in the discharge tube 20 are limited, light emission with uniform brightness distribution can be obtained even if the thicknesses of the linear electrodes 62*a* and distances therebetween are set to be uniform.

As shown in FIG. 6A, the linear electrodes 62*a* are in contact with the discharge tubes 20 at the grooves 51*a*. In other words, the second electrode 62 is brought into contact with an outer surface of each discharge tube 20 at a plurality of contact portions that are located at different distances from the first electrode 21. The contact portions constitute two groups arranged in parallel with the central axis of the discharge tube 20, as the contact portions 22P shown in FIG. 2B. These contact portions are separated from each other, and are provided discontinuously.

In the light source device 50, the application of a voltage across each first electrode 21 and the second electrode 62 causes discharge, thereby exciting the discharge medium. The discharge medium thus excited emits ultraviolet light when making a transition to a ground state. The ultraviolet light is converted into visible light by the phosphor layer 23, and the visible light is radiated from the discharge tubes 20. The visible light thus radiated is made more uniform by the diffusing plate 52. Thus, the light source device 50 functions as a planar light source.

Figure 7:
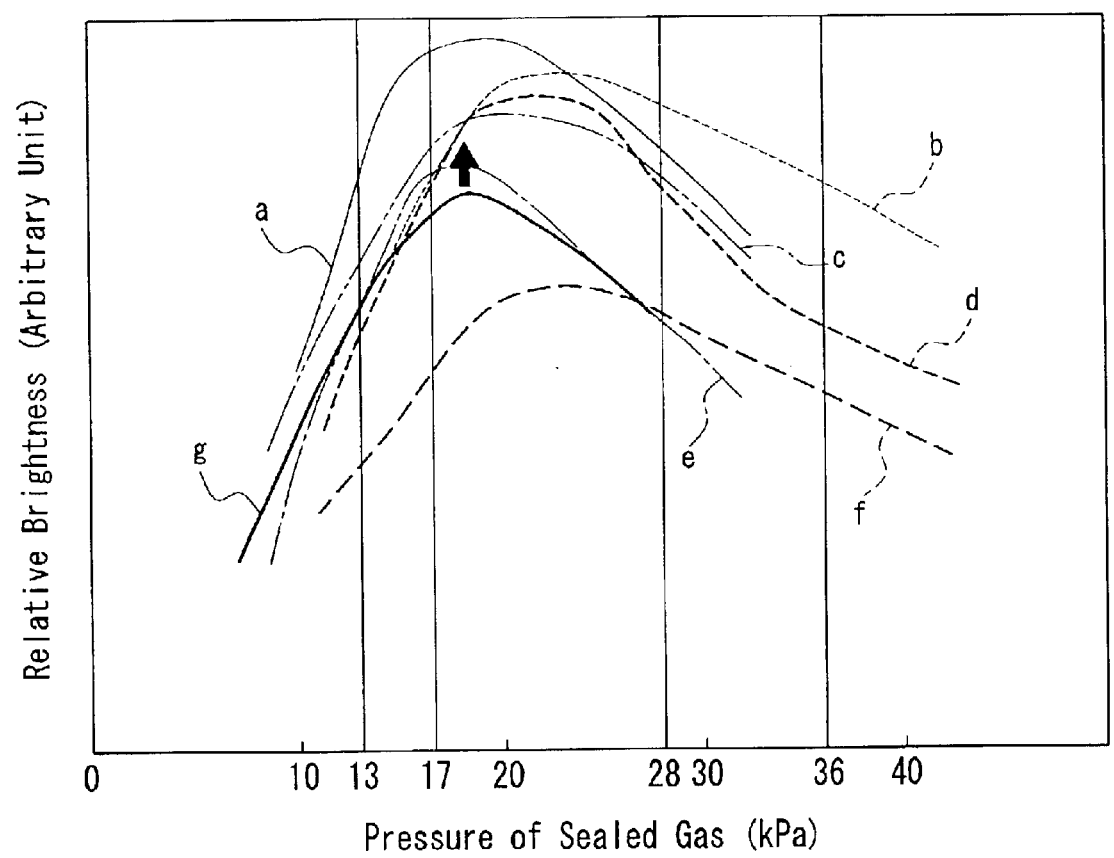
FIG. 7 is a graph illustrating the relationship between the pressure of sealed gas and a relative brightness in the case of a light source device shown in FIG. 5.

Experiments were carried out using the light source device 50 according to Embodiment 2 to examine the relationship between the composition of a sealed gas, the pressure thereof, and the brightness. The result of the experiments is shown in FIG. 7. In FIG. 7, the horizontal axis indicates the pressure of a gas sealed in the discharge tube 20, and the vertical axis indicates a relative value of the brightness. Lines a, b, c, d, e, f, and g denote cases in which the following gases were employed as sealed gases, respectively:

line a: xenon-argon (80 vol %:20 vol %)
line b: xenon-argon (60 vol %:40 vol %)
line c: xenon-krypton (80 vol %:20 vol %)
line d: xenon-krypton (60 vol %:40 vol %)
line e: xenon-neon (80 vol %:20 vol %)
line f: xenon-neon (60 vol %:40 vol %)
line g: xenon (100 vol %)

A discharge tube having an inside diameter of 2 mm, an outside diameter of 2.6 mm, and a length of 164 mm was used as the discharge tube 20. Further, the second electrode was formed so that each contact portion had a length of 3 mm in the tube axial direction. Furthermore, each distance between adjacent contact portions in the tube axial direction was set to be 1 mm.

As shown in FIG. 7, a light source device employing a mixture gas of argon gas/krypton gas and xenon gas (60 vol % to 80 vol %) (lines a, b, c, and d) had a peak of brightness higher than that of a light source device employing only xenon gas (line g). In the cases of light source devices denoted by the lines b, c, and d, peaks of the brightness shifted to a higher voltage side.

The light source device employing the xenon-neon mixture gas (80 vol %:20 vol %) (line e) had a brightness slightly higher than that of the light source device employing only xenon gas (line g). The light source device employing the xenon-neon mixture gas (60 vol %:40 vol %) (line f) had a peak of brightness lower than that of the light source device employing only xenon gas (line g).

As is seen from the above, in the case where a gas containing xenon (60 vol % to 80 vol %) as well as argon and/or krypton (40 vol % to 20 vol %) is sealed in the discharge tube 20, the brightness is increased. The pressure at which the gas is sealed preferably is in a range of 13 kPa to 36 kPa (more preferably, 17 kPa to 28 kPa), so as to obtain a brightness higher than that of the light source device employing only xenon gas (line g) and to prevent the discharge from being constricted. In the case where the sealing pressure is not more than 13 kPa, the number of xenon atoms that emit ultraviolet light decreases, so that the brightness tends to decrease in some cases. In the case where the sealing pressure is not less than 36 kPa, the discharge tends to be constricted, thereby reducing the brightness in some cases. It should be noted that by setting the content of xenon to 60 vol % or more, it is possible to secure a sufficient number of xenon atoms that emit ultraviolet light. Moreover, by setting the content of xenon to 80 vol % or less, it is possible to suppress a rise of the current density upon discharge, thereby suppressing the constriction of discharge.

The reason why the brightness is increased by using a mixture gas of argon/krypton gas and xenon gas is believed to be as follows.

Figure 8:
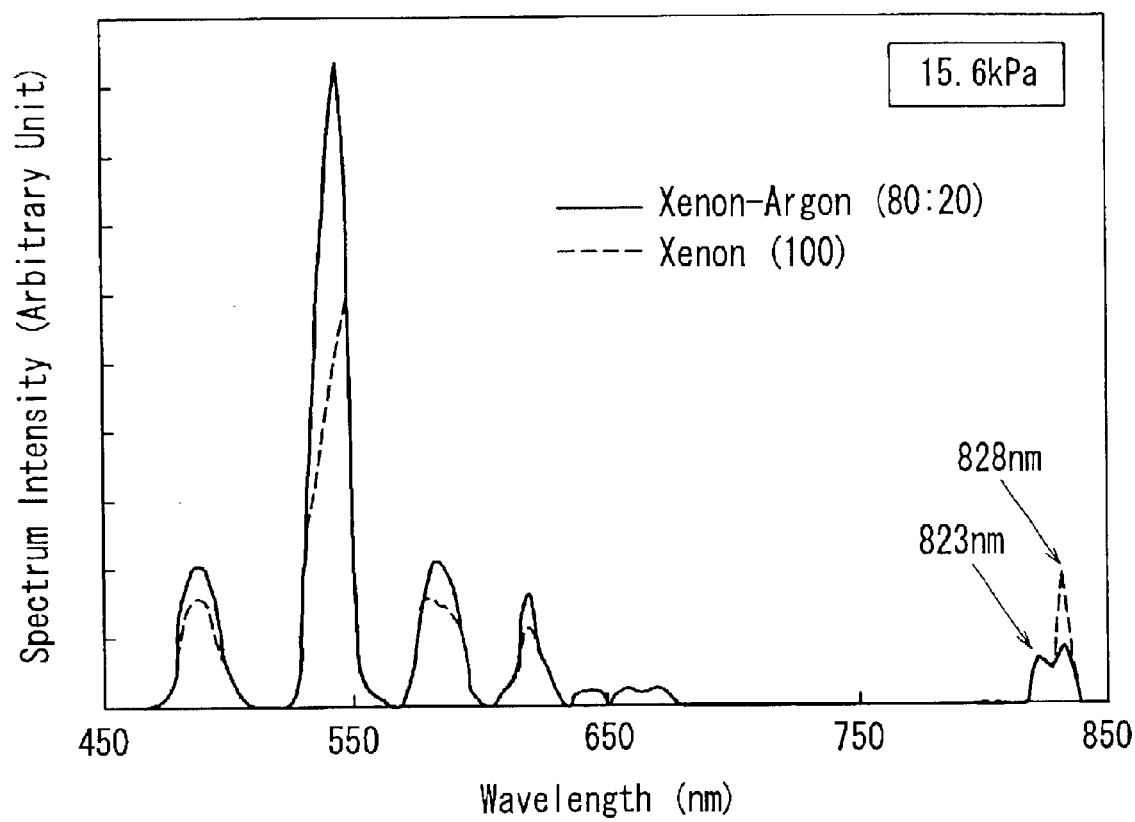
FIG. 8 is a graph of examples of emission spectra of light source devices in which different gases are sealed.

A light emission spectrum of a light source device employing a mixture gas of xenon (80 vol %) and argon (20 vol %) as sealed gas, and a light emission spectrum of a light source device employing only xenon as sealed gas are shown in FIG. 8. Here, a phosphor layer was formed with phosphors emitting light with three wavelengths. The pressure for sealing the gas was 15.6 kPa.

In the graph of FIG. 8, the spectrum in a range from 450 nm to 700 nm corresponds to light emitted from the phosphor layer that is excited by ultraviolet light generated by the excited sealed gas. The spectrum in a range greater than 800 nm corresponds to light emitted by xenon.

As shown in FIG. 8, even with the different sealed gases, the light source devices had substantially equal intensities of xenon light at 823 nm. On the other hand, the light source device employing the mixture gas had a smaller light intensity at 828 nm. Similar results were obtained regarding the light source device employing the mixture gas of 60 vol % xenon and 40 vol % argon, the light source device employing the mixture gas of 60 vol % xenon and 40 vol % krypton, and the light source device employing the mixture gas of 80 vol % xenon and 20 vol % krypton. The greater emission spectrum intensity of a phosphor means that a light source device has a higher brightness, and that ultraviolet lights (147 nm and 172 nm) generated by excitation of a sealed gas have greater intensities. A decrease in the spectrum intensity in a range of greater than 800 nm (for instance, at peaks of 823 nm and 828 nm) indicates that energy loss decreased.

Figure 9:
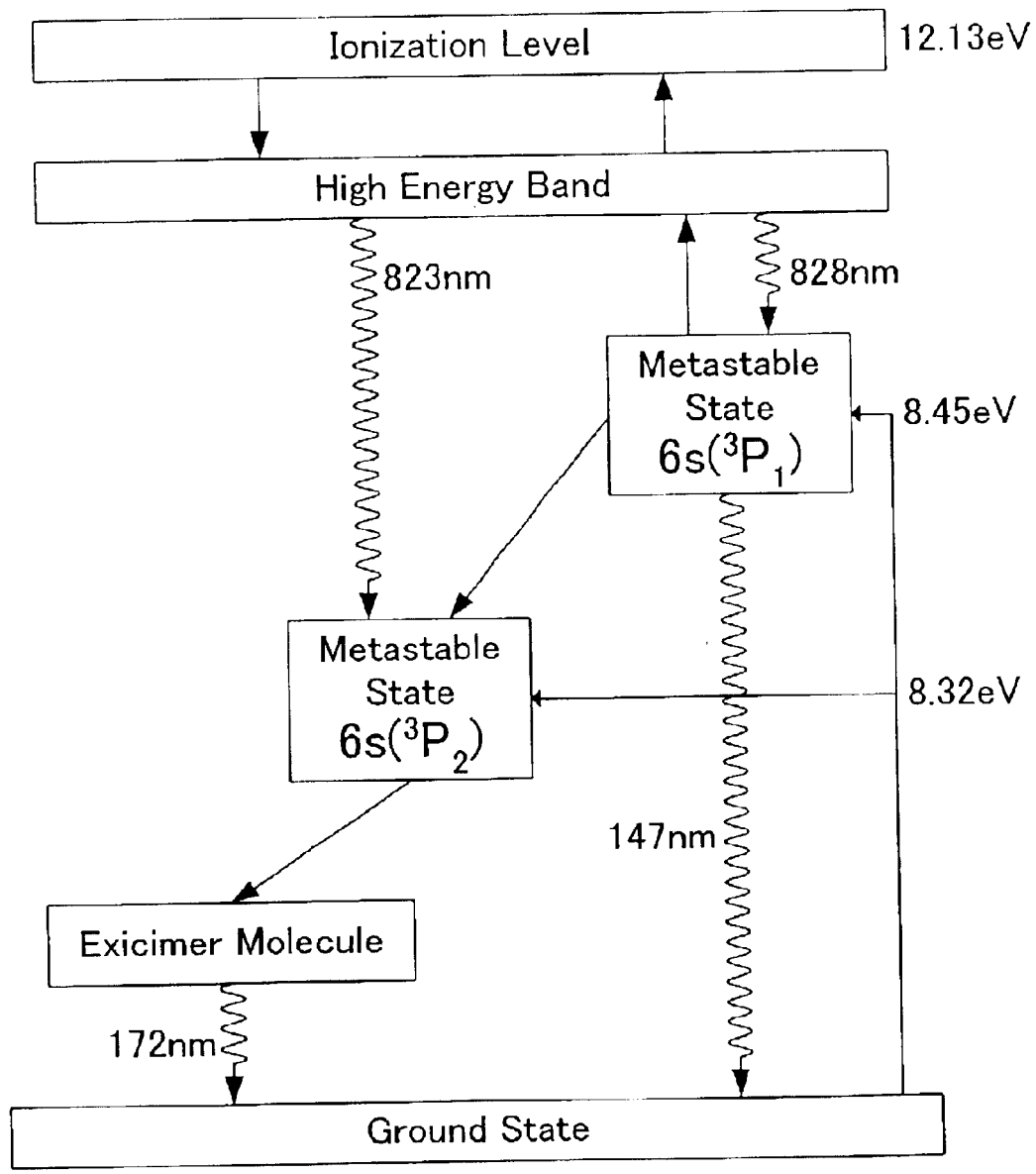
FIG. 9 is a diagram schematically illustrating a process of excitation of xenon.

FIG. 9 is a schematic diagram illustrating an excitation process for xenon. It is considered that in the light source device employing the mixture gas of xenon and argon, the excitation from a metastable state 6 s($^3P_1$) to a high energy band shown in FIG. 9 was suppressed, and resultant surplus energy was used for the emission of ultraviolet light. Consequently, it is considered that the light source device had a decreased emission spectrum intensity of xenon at 828 nm, thereby having an increased emission spectrum intensity of the phosphor. On the other hand, the reason why the emission spectrum intensities of xenon at 823 nm were equal as shown in FIG. 8 is considered to be that an energy difference between the meta stable state 6 s($^3P_2$) and the high energy band was great, thereby causing hardly any excitation to the high energy band to occur, resulting in no change. It should be noted that with a uniform sealing pressure for sealing gas, in the case where an amount of xenon is set to be not more than 60 vol %, an amount of xenon atoms emitting ultraviolet light decreases, thereby decreasing the brightness.

Figure 10A:
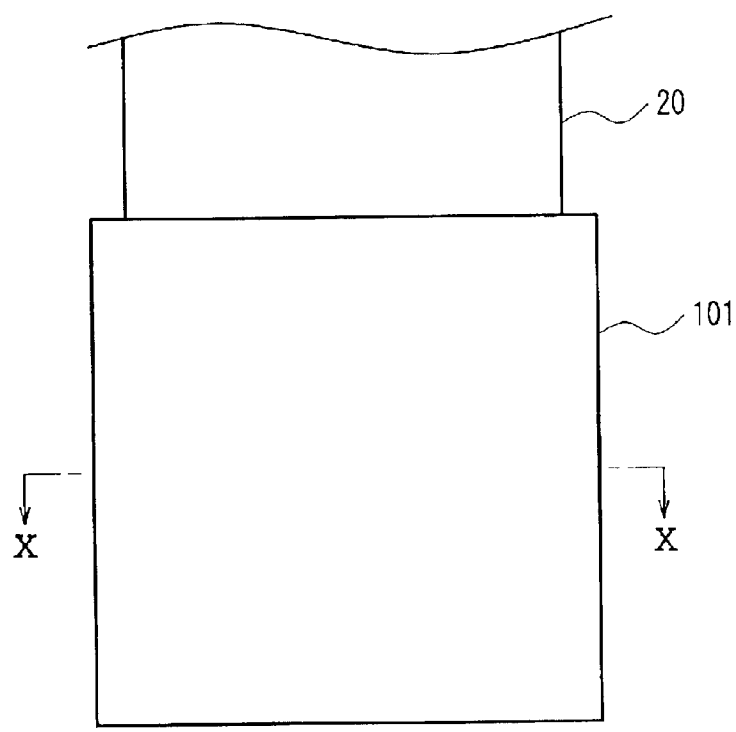
FIG. 10A is a plan view of another example of the first electrode.
Figure 10B:
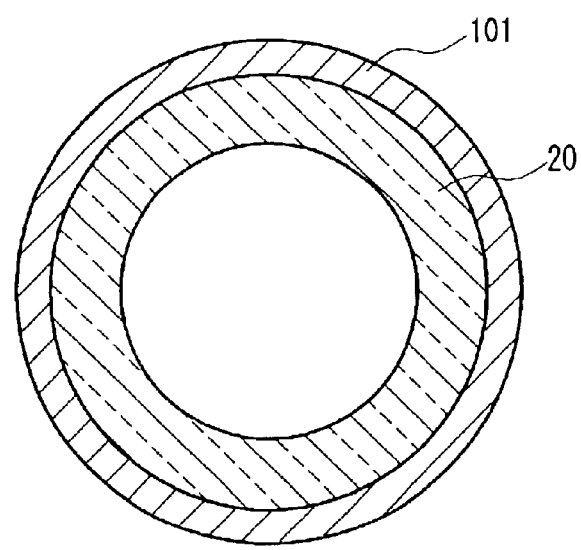
FIG. 10B is a cross-sectional view of the same.

An example of a light source device according to Embodiment 2 is described as above, but the present invention is not limited to the foregoing device. For instance, a light source device of the present invention may include two first electrodes 21 at both ends of each discharge tube 20. The first electrode may have a cylindrical form, and may be provided around a outside surface of the discharge tube 20. An example of the cylindrical first electrode 101 is shown in FIG. 10A. FIG. 10B illustrates a cross section of the first electrode 101 taken along a line X—X in FIG. 10A. The outside of the first electrode 101 preferably is covered with an insulation layer. The first electrode 101 is arranged so as to cover an end of the discharge tube 20.

Figure 11:
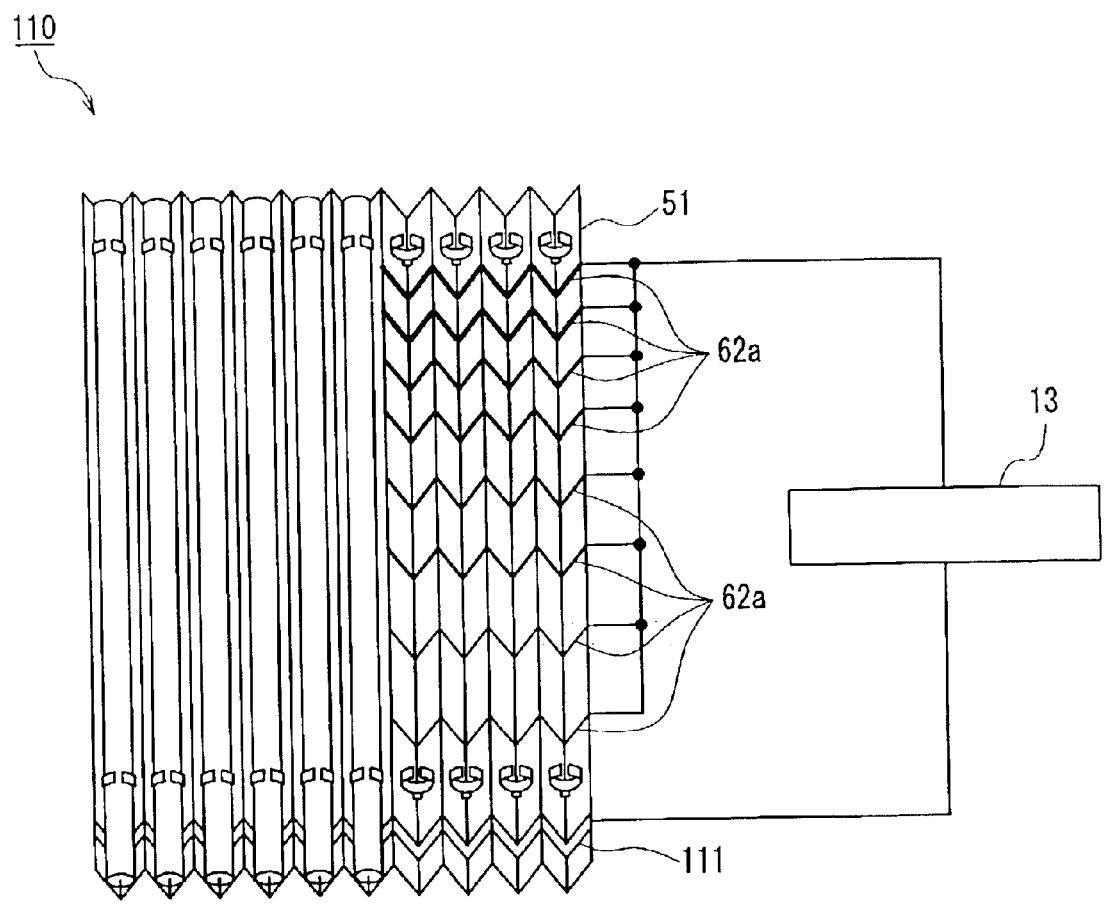
FIG. 11 is a plan view schematically illustrating another example of a light source device of the present invention.

Furthermore, the first electrodes may be formed on a supporting plate 51, as the linear electrodes 62a are. FIG. 11 is a plan view of an example of the light source device 110. The light source device 110 is identical to the light source device 50 except for a first electrode 111. The first electrode 111 can be made of a metal paste, like the linear electrodes 62a.

The light source device of the present embodiment is applicable in a display device of a field-sequential type, as a backlight for use therein. In this case, a plurality of discharge tube groups, each group consisting of a discharge tube emitting red-color light, a discharge tube emitting green-color light, and a discharge tube emitting blue-color light, may be provided on a supporting plate.

With the light source device according to Embodiment 2, it is possible to achieve the same effect as that of the light source device according to Embodiment 1. The light source device according to Embodiment 2 can be used as a planar light source, and is applicable as, for instance, a backlight in a liquid crystal display device. In such a case, a liquid crystal panel is arranged above the diffusing plate 52.

Embodiment 3

Figure 12:
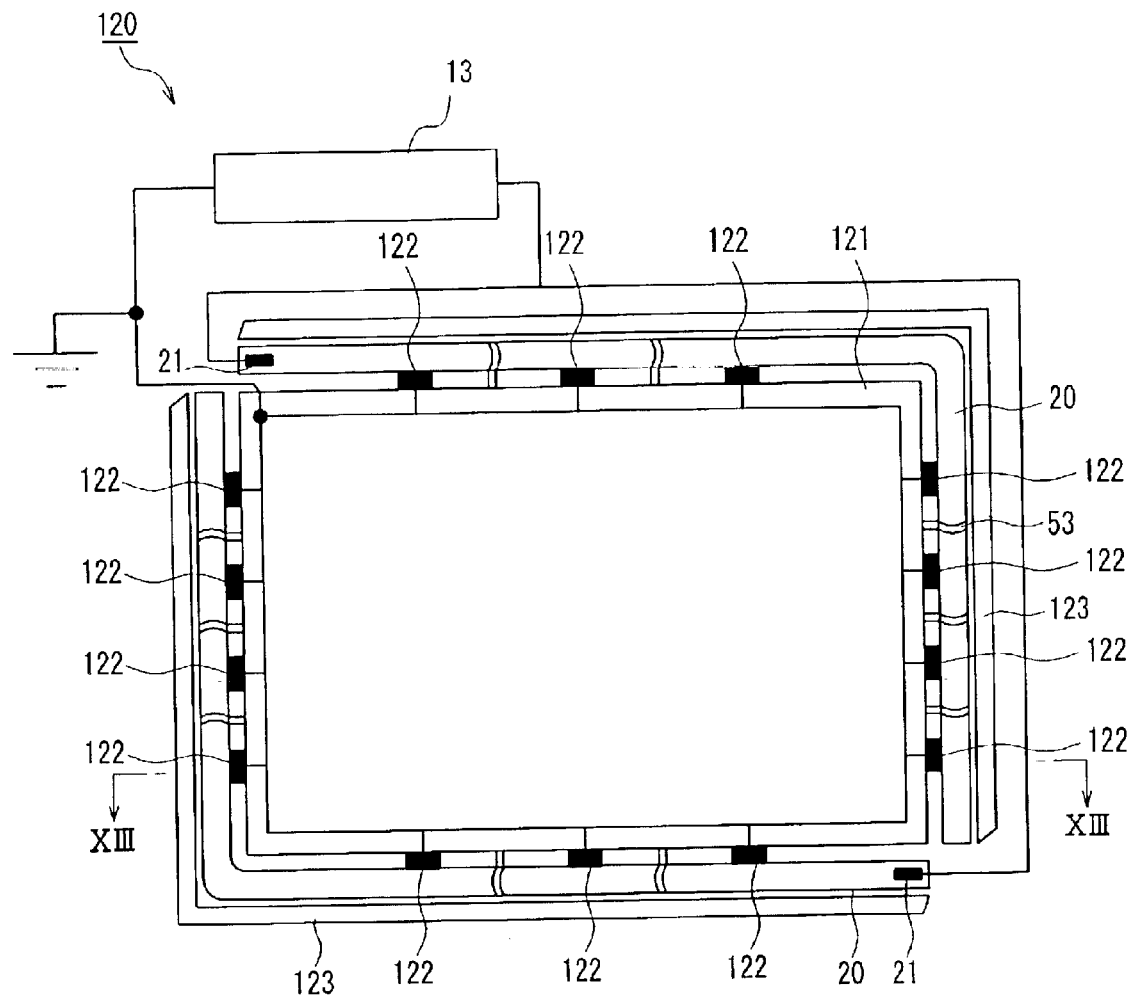
FIG. 12 is a plan view schematically illustrating still another example of a light source device of the present invention.
Figure 13:
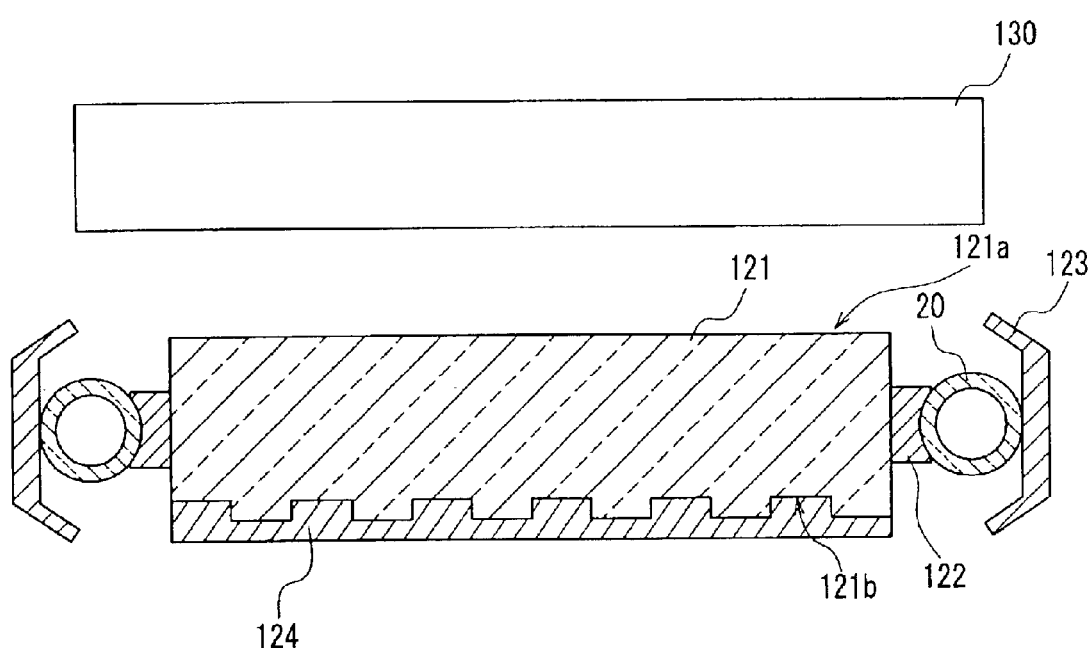
FIG. 13 is a cross-sectional view of the light source device shown in FIG. 12.

In Embodiment 3, another example of a light source device of the present invention is described. A light source device 120 according to Embodiment 3 is shown in FIG. 12. FIG. 13 illustrates a cross sectional of the light source device 120 taken along a line XIII—XIII in FIG. 12. It should be noted that a liquid crystal panel 130 also is illustrated in FIG. 13.

The light source device shown in FIG. 12 includes a light-guiding plate 121, discharge tubes 20, first electrodes 21, second electrodes 122, and reflecting plates 123.

In the light source device 120, the second electrodes 122 are arranged between the light-guiding plate 121 and the discharge tubes 20. The second electrodes 122 can be made of a metal paste, a conductive resin, or the like. The discharge tubes 20, each in a shape of the letter L, are supported by supporting members 53. A third electrode preferably is formed at a bend of the L-shaped discharge tube 20. The reflecting plates 123 are provided outside the discharge tubes 20, for reflecting light emitted from the discharge tubes 20 toward the light-guiding plate 121 side. In the case where the light source device 120 is used as a backlight of the liquid crystal display device, a liquid crystal panel 130 is provided on the light-guiding plate 121 as shown in FIG. 13.

The discharge tubes 20 are arranged on a side of the light-guiding plate 121. The light-guiding plate 121 causes light emitted from the discharge tubes 20 to leave the front face 121a of the light-guiding plate 121 substantially uniformly. The light-guiding plate 121 can be made of, for instance, a transparent resin. A rear face 121b of the light-guiding plate 121 is corrugated so as to make the light leaving therefrom uniform. Additionally, a reflecting layer 124 is formed on the rear face 121b. The reflecting layer 124 can be made of, for instance, titanium oxide or a metal. Furthermore, a diffusing sheet or a lens sheet may be arranged on the front face 121a of the light-guiding plate 121 as required according to a condition of use. In the light source device 120 as well, the second electrode 122 is in contact with each discharge tube 20 at a plurality of portions that are located at different distances from the first electrode 21 and that are provided discontinuously.

Figure 14:
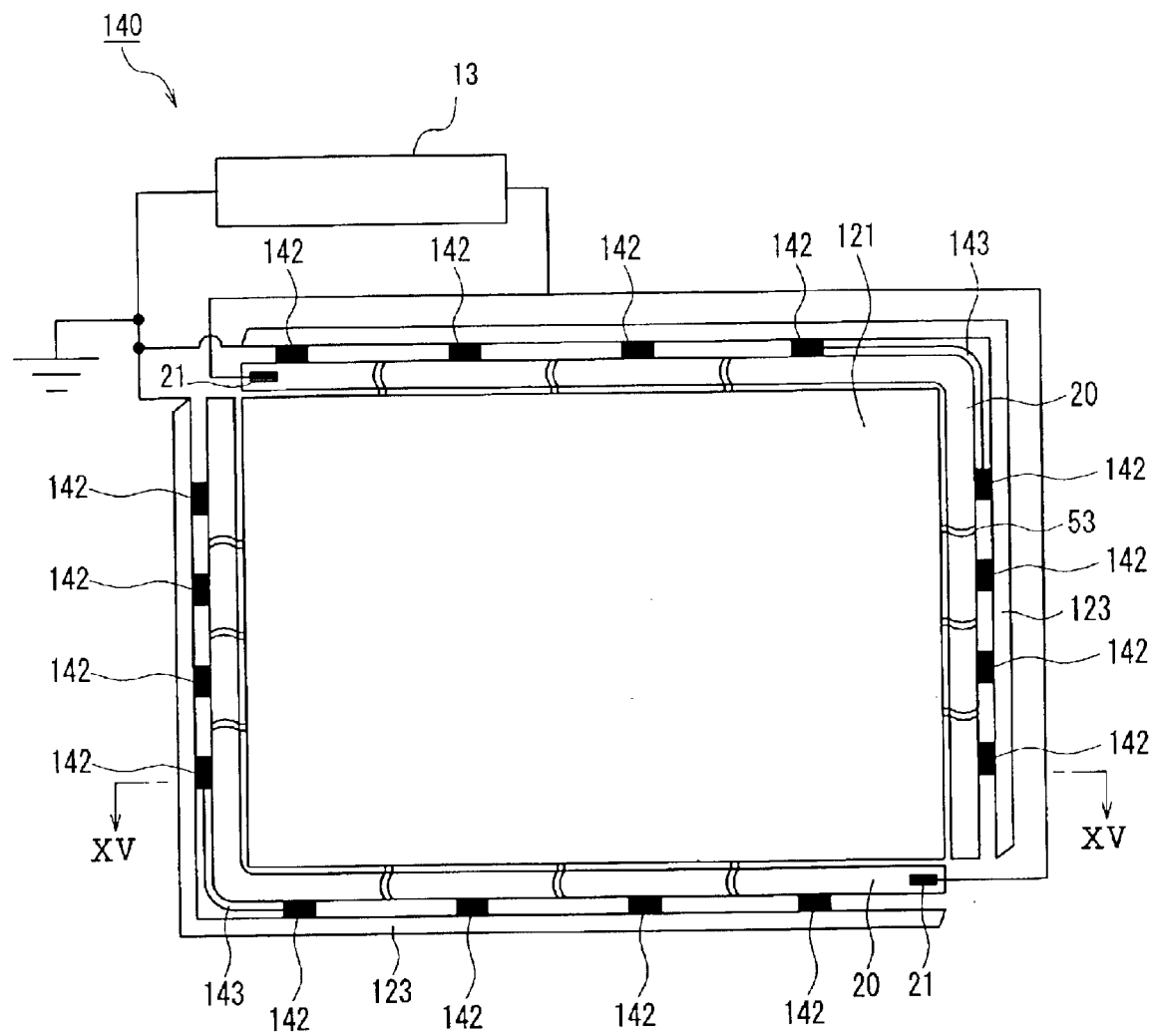
FIG. 14 is a plan view schematically illustrating still another example of a light source device of the present invention.
Figure 15:
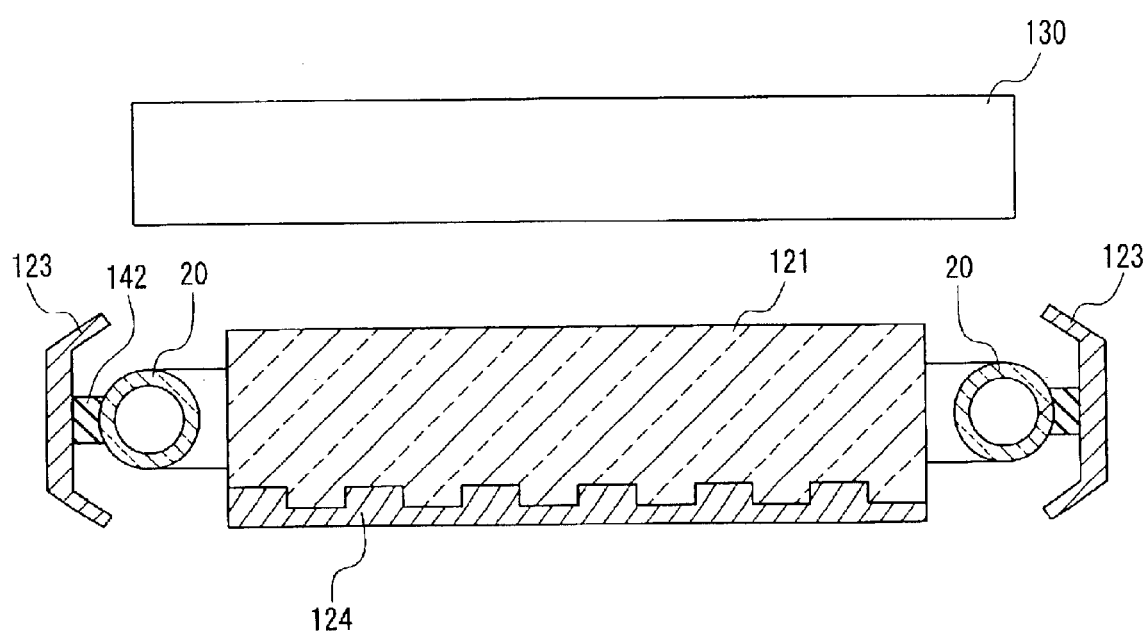
FIG. 15 is a cross-sectional view of the light source device shown in FIG. 14.

Alternatively, the second electrodes may be formed between the discharge tubes and reflecting plates. FIG. 14 schematically illustrates a configuration of such a light source device 140. FIG. 15 illustrates a cross section of the light source device 140 taken along a line XV—XV. It should be noted that the liquid crystal panel 130 also is illustrated in FIG. 15.

In the light source device 140, second electrodes 142 are arranged between the discharge tubes 20 and the reflecting plates 123. The second electrodes 142 can be made of a metal paste, a conductive resin, or the like. The discharge tubes 20, each in a shape of the letter L, are supported by supporting members 53. A third electrode 143 is formed at a bend of the L-shaped discharge tube 20. The reflecting plates 123 arranged outside the discharge tubes 20 reflect light emitted from the discharge tubes 20 toward the light-guiding plate 121 side. In the case where the light source device 200 is used as a backlight of the liquid crystal display device, a liquid crystal panel 130 is provided on the light-guiding plate 121 as shown in FIG. 15.

As described above, in a light source device of the present invention, a second electrode and discharge tubes are in contact with each other at a plurality of portions that are located at different distances from the first electrodes. This light source device can prevent the discharge from being concentrated in the vicinity of the second electrode. Further, in the light source device of the present invention, a high brightness can be achieved by specifying a gas sealed in the discharge tubes. Furthermore, the light source device of the present invention does not require the use of a shrinkable tube or the like for fixing the second electrode to the discharge tubes. Therefore, it is manufactured readily, and allows the discharge tubes to be formed in freely determined shapes. The light source device of the present invention is applicable as a light source in various apparatuses, for instance, as a backlight in a liquid crystal display device.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light source device comprising at least one discharge and first and second electrodes, wherein application of a voltage only across a first electrode a second electrode causes excitation of a discharge medium sealed inside the discharge tube, wherein
   the first electrode is arranged only at an end inside the discharge tube,
   the second electrode is in contact with an outer surface of the discharge tube at a plurality of contact portions, the contact portions being located at different distances from the first electrode and being provided discontinuously, and
   the plurality of the contact portions are arranged in a tube axial direction of the discharge tube at the same potential, and
   a mixture gas containing xenon gas and at least one selected from argon and krypton gas is sealed in the discharge tube, the xenon gas accounting for 60 percent by volume to 80 percent by volume.

2. The light source device according to claim 1, wherein the mixture gas is a mixture gas of argon gas and xenon gas.

3. The light source device according to claim 1, wherein the discharge medium does not contain mercury.

4. The light source device according to claim 1, wherein the mixture gas is sealed at a pressure in a range of 13 kPa to 36 kPa.

5. The light source device according to claim 1, further comprising a phosphor layer formed on an inner surface of the discharge tube.

6. The light source device according to claim 1, wherein the discharge tube includes a glass tube, and a dielectric layer formed on an outer surface of the glass tube.

7. The light source device according to claim 1, wherein the second electrode is in contact with the discharge tube via a dielectric.

8. The light source device according to claim 1, further comprising a supporting plate, wherein the discharge tube is arranged on a side of the supporting plate.

9. The light source device according to claim 8, wherein the supporting plate receives light emitted from the discharge tube, and radiates the same from one principal surface of the supporting plate.

10. The light source device according to claim 7, further comprising a supporting plate, wherein
    a plurality of the discharge tubes are held on the supporting plate,
    the second electrode includes a plurality of linear electrodes arranged in parallel on the supporting plate, and
    the discharge tubes are arranged so as to be perpendicular to the linear electrodes.

11. A liquid crystal display device comprising
    a light source device, wherein the light source device comprises at least one discharge tube and first and second electrodes, in which application of a voltage only across a first electrode and a second electrode causes excitation of a discharge medium sealed inside the discharge tube, wherein the first electrode is arranged only at an end inside the discharge tube, the second electrode is in contact with an outer surface of the discharge tube at a plurality of contact portions, the contact portions being located at different distances from the first electrode and being provided discontinuously, the plurality of the contact portions are arranged in a tube axial direction of the discharge tube at the same potential, and a mixture gas containing xenon gas and at least one selected from argon gas and krypton gas is sealed in the discharge tube, the xenon gas accounting for 60 percent by volume to 80 percent by volume.

12. The liquid crystal display device according to claim 11, wherein
    the light source device further includes a light-guiding plate that receives light emitted from the discharge tube and allows the light to leave a principal surface thereof, and
    the liquid crystal panel is arranged so as to face the light-guiding plate.

13. The liquid crystal display device according to claim 11, wherein the light source device further includes a supporting plate, wherein
    a plurality of the discharge tubes are held on the supporting plate,
    the second electrode includes a plurality of linear electrodes arranged in parallel, and
    the discharge tubes are arranged so as to be perpendicular to the linear electrodes.

14. The light source device according to claim 1, wherein a distance between the contact portions is greater than a wall thickness of the discharge tube.

15. The liquid crystal display device according to claim 11, wherein the mixture gas is a mixture gas of argon gas and xenon gas.

16. The liquid crystal display device according to claim 11, wherein the discharge medium does not contain mercury.

17. The liquid crystal display device according to claim 11, wherein a distance between the contact portion is greater than a wall thickness of the discharge tube.

* * * * *

UNITED STATES PATENT AND TRADEMARK OFFICE
CERTIFICATE OF CORRECTION

PATENT NO.      : 6,806,648 B2
DATED           : October 19, 2004
INVENTOR(S)     : Shimizu et al.

It is certified that error appears in the above-identified patent and that said Letters Patent is hereby corrected as shown below:

Column 11,
Lines 33-34, "one discharge and" should read -- one discharge tube and --
Line 35, "electrode a second" should read -- electrode and a second --

Signed and Sealed this

Twenty-sixth Day of April, 2005

JON W. DUDAS
*Director of the United States Patent and Trademark Office*